United States Patent [19]
Moody

[11] Patent Number: 5,163,466
[45] Date of Patent: Nov. 17, 1992

[54] DUAL-TANK FUEL UTILIZATION SYSTEM

[76] Inventor: Warren L. Moody, 1017 Harper's Way, Anderson, S.C. 29621

[21] Appl. No.: 802,086

[22] Filed: Dec. 3, 1991

[51] Int. Cl.$^5$ ............................................. F02M 37/00
[52] U.S. Cl. ...................................... 137/255; 137/597
[58] Field of Search ............... 137/112, 113, 255, 256, 137/597, 1

[56] References Cited
U.S. PATENT DOCUMENTS

| | | | |
|---|---|---|---|
| 3,503,412 | 3/1970 | Schuler | 137/265 |
| 3,981,321 | 9/1976 | Risse | 137/255 |
| 4,386,625 | 6/1983 | Perkins | 137/255 |
| 4,683,864 | 8/1987 | Bucci | 137/255 X |
| 4,930,537 | 6/1990 | Farmer | 137/265 |

Primary Examiner—Alan Cohan
Attorney, Agent, or Firm—Bailey & Hardaway

[57] ABSTRACT

A dual-tank fuel utilization system is provided wherein a valve apparatus is used to control flow between dual fuel tanks and an engine, the valve apparatus comprising a housing having a plurality of inlet ports and exit ports and defining a plurality of passages therein and switching means for selectively blocking one of the passages while simultaneously allowing flow through another of the passages.

9 Claims, 2 Drawing Sheets

DUAL-TANK FUEL UTILIZATION SYSTEM

BACKGROUND OF THE INVENTION

This invention relates generally to the art of fuel utilization systems, and more particularly to the art of a fuel utilization system for use with dual-tank fuel systems.

It has been common in the past with multiple-tank fuel systems to employ crossover lines cooperating with the bottom walls of the tanks in order to allow gravity to force flow through the lines. U.S. Pat. No. 3,981,321 discloses an above-tank crossover line for multiple-tank fuel systems. U.S. Pat. No. 4,930,537 discloses a vehicle multiple-tank fuel system for a truck utilizing an above-tank crossover line coupling a primary and a secondary tank, a draw line coupled only to the primary tank and a return line coupled to the crossover line or to either of the tanks separately. The crossover line upon which this system depends is intended to function as a siphon to maintain equal levels in the primary and secondary tanks. U.S. Pat. No. 3,503,412 discloses a two tank bulk fluid system comprising manually operated rotary valves. The prior art usage of below-tank crossover lines to couple multiple-tank fuel systems makes such crossover lines subject to damage and subsequent fuel spills because of their location. The use of an above-tank crossover line in a multiple-tank fuel system has proven by past experience to be somewhat unreliable in a dynamic application such as a highway truck, because such crossover lines act as siphon tubes and are influenced by very small pressure differentials and are very susceptible to entrained gases in the fluid. The operation of a highway truck creates considerable fluid dynamics within the fuel tanks resulting in pressure differentials at the siphon tube ends sufficient to disrupt or even reverse the fluid flow. Entrained gases in the fuel will seek the highest point in a system and, therefore, accumulate in the upper part of the siphon line. Accumulation of such gases in this portion of the siphon line will cause liquid flow to cease. The use of rotary valves to switch fuel supply momentarily stops the flow of fuel until the switching process is completed. Momentary stopping of both the supply and returned fuel flow of an operating heavy duty diesel engine would result in an immediate power loss and possible damage to various components of the engine fuel system.

For the reasons discussed above, it is evident that much room for improvement exists in the art of fuel utilization systems for multiple, and more specifically, dual-tank fuel systems.

SUMMARY OF THE INVENTION

It is thus an object of this invention to provide a novel dual-tank fuel utilization system.

It is thus another object of this invention to provide such a novel dual-tank fuel utilization system wherein switching of fuel flow from one tank to another does not interrupt fuel flow to an engine.

It is another object of this invention to provide such a novel dual-tank fuel utilization system which can be provided with automatic switching means to control fuel flow from the dual-tank system.

It is yet a further object of this invention to provide such a novel dual-tank fuel utilization system which can be used to manually switch fuel flow from one tank to another.

It is still a further object of this invention to provide such a novel dual-tank fuel utilization system which provides balanced torsional loading of the truck frame.

These as well as other objects are accomplished by a dual-tank fuel utilization system comprising a first fuel tank and a second fuel tank having draw tubes and return tubes connected through a valve apparatus to an engine, with the valve apparatus comprising a housing having a plurality of inlet and exit ports and defining a plurality of passages within the housing, and switching means for selectively blocking certain of the inlet and exit ports while simultaneously allowing flow into other of the inlet ports and allowing flow from other of the exit ports.

DETAILED DESCRIPTION

In accordance with this invention, it has been found that a novel dual-tank fuel utilization system can be provided. It has also been found that such a novel dual-tank fuel utilization system can be provided wherein switching of fuel flow from one tank to another does not interrupt fuel flow to an engine. The dual-tank fuel utilization system according to this invention can be adapted to automatically switch fuel flow from one tank to another or can be used to manually switch fuel flow from one tank to another. It has further been found that such a dual-tank fuel utilization system can provide balanced torsional loading of the truck frame.

Other advantages and features will become apparent from a reading of the following description given with reference to the various figures of drawings.

Figure 1:
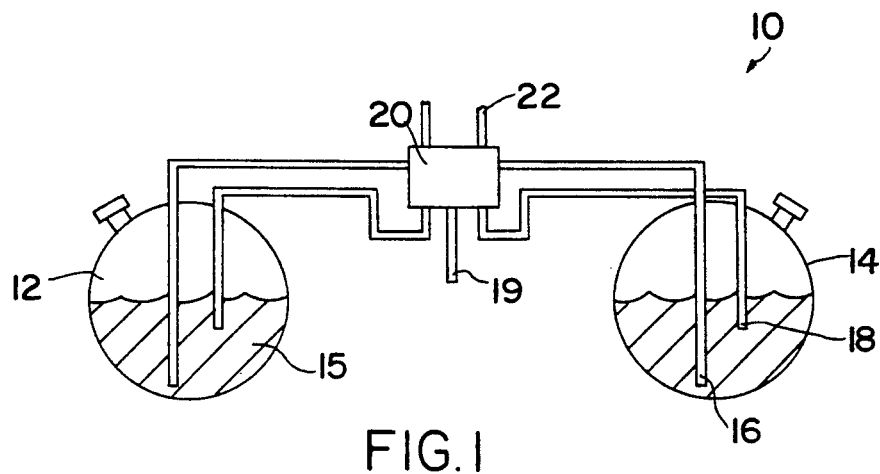
FIG. 1 of the drawings is a perspective view of the dual-tank utilization system according to the present invention.

FIG. 1 of the drawings is a perspective view of the dual-tank fuel utilization system 10 according to the present invention. The fuel utilization system, as illustrated, comprises a first fuel tank 12 and a second fuel tank 14, each defining an interior designed to hold a liquid such as fuel 15 therein. A draw tube 16 terminates at a low end in the interior of each tank 12 and 14 and a return tube 18 extends partially into each tank 12 and 14. Draw tubes 16 and return tubes 18 all connect to a valve apparatus 20, more specifically illustrated in the following figures of drawings. Valve apparatus 20 in FIG. 1 includes two exit tubes 22 on its upper portion for fluid communication with a fuel supply of an engine. In normal operation, however, only one of the exit tubes 22 would be operable to provide fluid communication with a fuel supply of an engine. Return line 19 is also illustrated in FIG. 1 and is designed to connect to the engine and to act as a return line for fuel not used by the engine to return to tanks 12 and 14.

Figure 2:
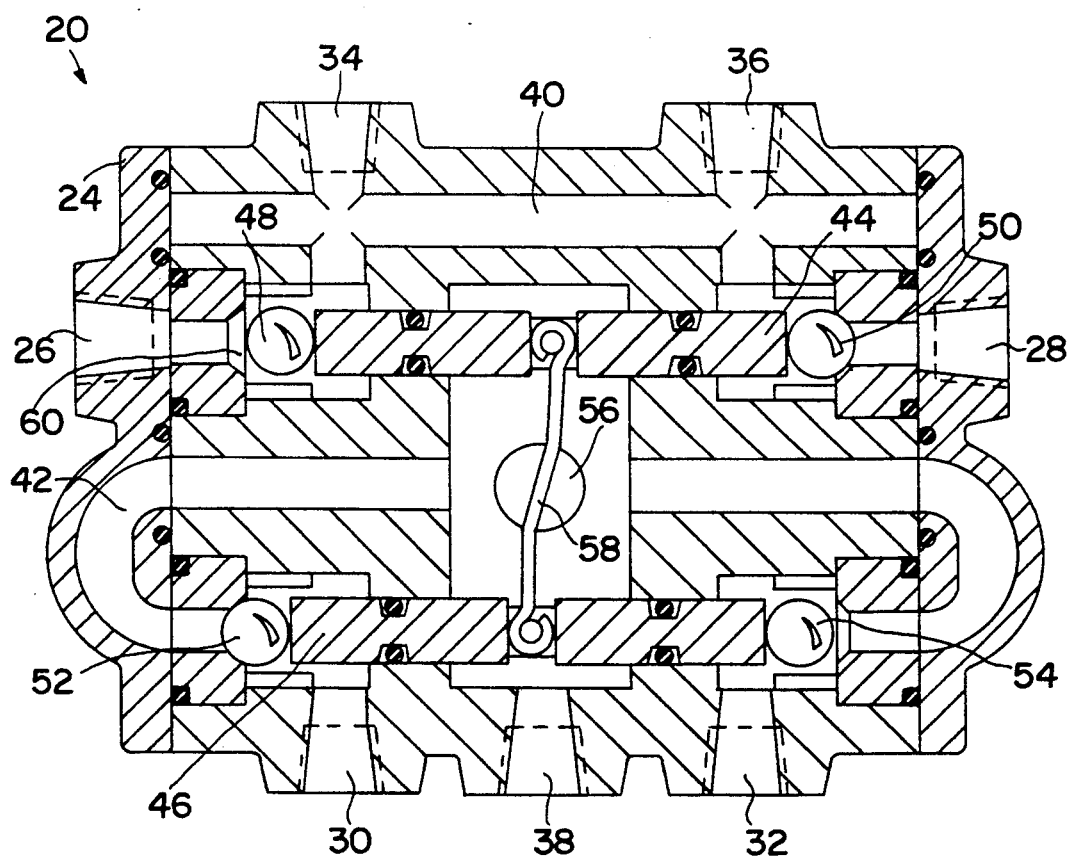
FIG. 2 of the drawings is a cross-section view illustrating the valve for the dual-tank fuel utilization system according to the present invention.

FIG. 2 of the drawings is a cross-section view of the valve apparatus 20 for the dual-tank fuel utilization system according to the present invention. Valve apparatus 20 comprises a housing 24 having two inlet ports 26 and 28, each inlet port 26 and 28 adapted for fluid communication with draw tubes 16 from each of fuel tanks 12 and 14 (illustrated in FIG. 1). Housing 24 of valve apparatus 20 also defines two exit ports 30 and 32 adapted for fluid communication with the return tubes 18 of fuel tanks 12 and 14 seen in FIG. 1. Two upper exit ports 34 and 36 are further defined by housing 24 and are adapted for fluid communication with a fuel supply of an engine such as exit tubes 22 seen in FIG. 1. Although there are two upper exit ports 34 and 36 and both are possible for use, in normal operation, however, it is preferred that one of upper exit ports 34 and 36 be plugged so that there is only one communication of fuel supply to an engine from valve apparatus 20. An inlet port 38 is also defined by housing 24 and is designed for fluid communication with return line 19 from an engine as seen in FIG. 1. Port 38 is in fluid communication with exit ports 30 and 32 by way of passages defined by valve apparatus 20 and discussed below.

A plurality of passages are defined within housing 24 including a separate first passage 40 connecting inlet ports 26 and 28 and exit ports 34 and 36. A separate second passage 42 is defined within housing 2 and connects exit ports 30 and 32 and inlet port 38. Valve apparatus 20 further includes switching means for selectively blocking one of inlet ports 26 or 28 connected by first passage 40 and blocking one of exit ports 30 or 32 connected by second passage 42 while simultaneously allowing flow into the unblocked inlet port 26 or 28 connected by first passage 40 and allowing flow from the unblocked exit port 30 or 32 connected by second passage 42. The switching means is illustrated as comprising two spools 44 and 46, spool 44 positioned for regulation of first passage 40 and spool 46 positioned for regulation of second passage 42. Positioned at the end of both spools 44 and 46 are rubber balls 48, 50, 52 and 54. Rubber balls 48, 50, 52 and 54 are movable by spools 44 and 46 within housing 24. A cross shaft 56 extends centrally through housing 24 and between spools 44 and 46. Attached to cross shaft 56 and connected to spools 44 and 46 is leaf spring 58. Leaf spring 58 is pivotally attached to spools 44 and 46 such that rotation of cross shaft 56 causes spool 44 to stroke or move in one direction while simultaneously causing spool 46 to move in the opposite direction. Movement of spools 44 and 46 thereby cause the respective rubber balls to move in a blocking fashion upon a seat such as seat 60 thereby blocking flow through seat 60 or to move away from a seat such as seat 60 thereby allowing flow through seat 60. The dual-tank fuel utilization system utilizing this spool embodiment for a switching means therefore allows flow into inlet port 26 and from exit port 32 while simultaneously blocking flow into inlet port 28 and from exit port 30, as illustrated in FIG. 2 of the drawings.

Figure 3:
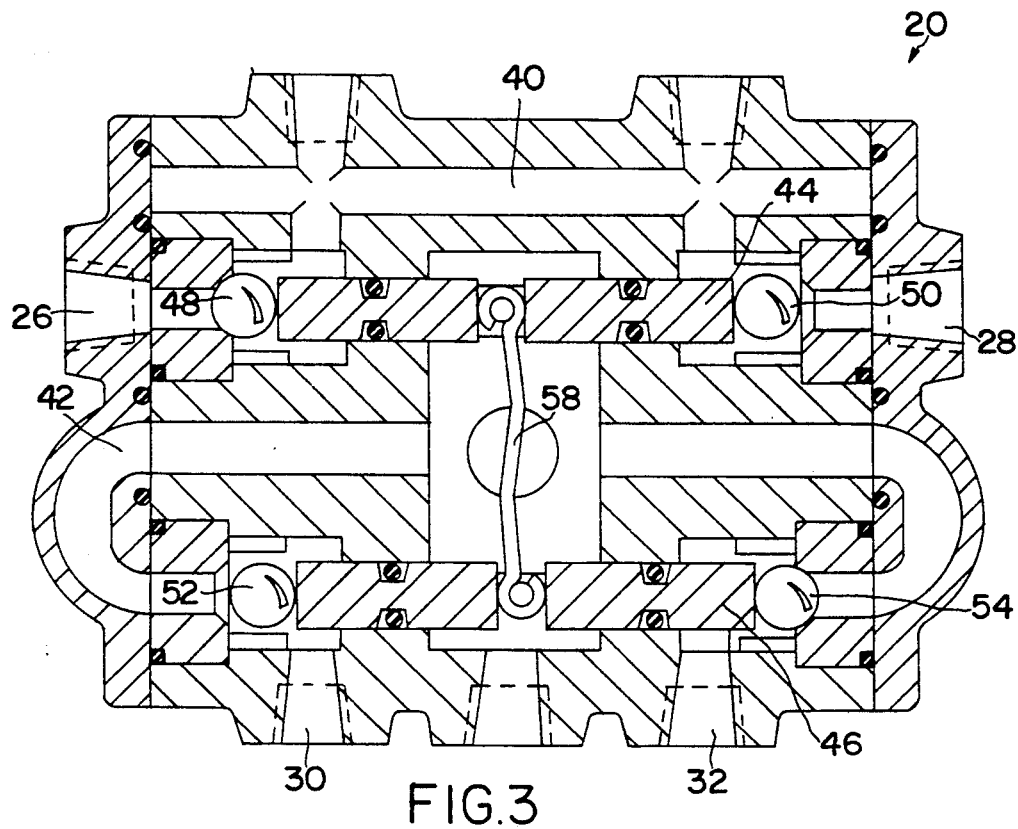
FIG. 3 of the drawings is a cross-section view of the valve according to the present invention illustrating the spools in a shifted position.

FIG. 3 is a cross-section view of the valve apparatus 20 according to the present invention illustrating spools 44 and 46 in a shifted position from that shown in FIG. 2 of the drawings. Rubber ball 48 has been forced upon seat 60 (FIG. 2) so as to block flow into inlet 26. As a result, movement of spool 44 to position rubber ball 48 as such thereby allows rubber ball 50 to be unseated, allowing flow into inlet 28. Also, as a result of the pivotal connection of leaf spring 58 to spools 44 and 46, rubber ball 52 is in an unseated position, allowing flow from exit port 30, and rubber ball 54 is forced into a seated position, thereby blocking flow from exit port 32. As apparent from the structure and connection of spools 44 and 46 and the position of rubber balls 48, 50, 52 and 54, at the same time one end of either spool 44 of 46 is forcing a rubber ball upon a seat to block flow, the opposite end of either spool 44 or 46 is simultaneously moving away from its respective rubber ball thereby allowing the ball to unseat and flow to commence. Also, as one of spools 44 or 46 moves to the right, the other spool 44 or 46 moves to the left, thereby insuring a noninterrupted fuel flow during the switching process. Each spool 44 and 46 is pressure balanced end to end, therefore requiring very little force to stroke spools 44 and 46. Valve apparatus 20 is designed to operate at relatively low pressures and consequently, the force required to seat and seal a seat such as seat 60 in FIG. 2 is minimal.

Figure 4:
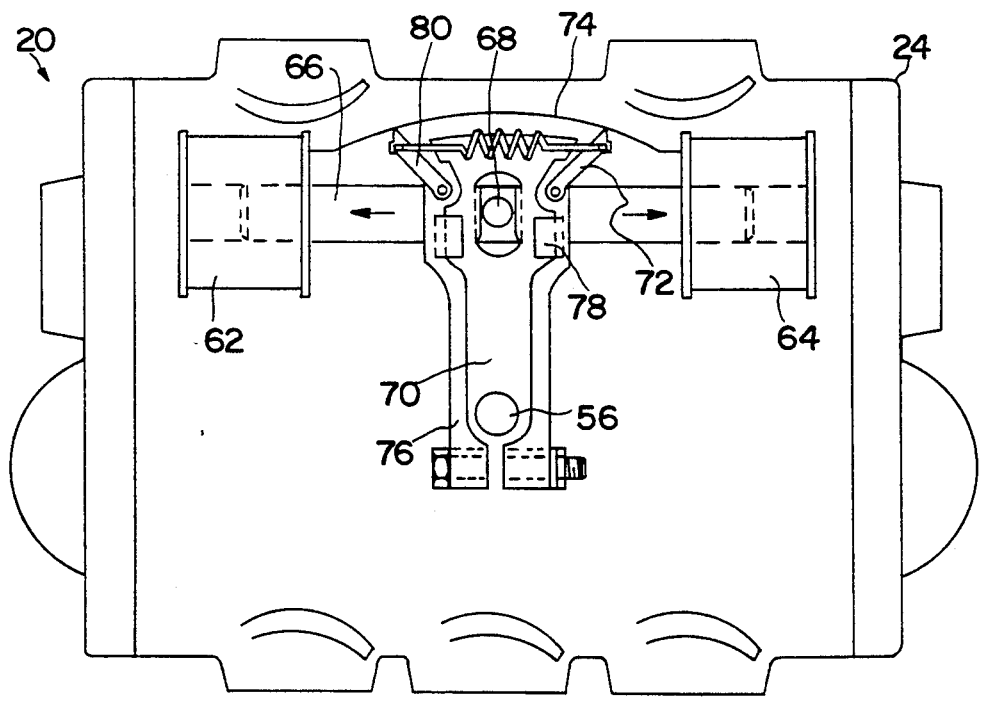
FIG. 4 of the drawings is a plan view of the valve according to the present invention illustrating a preferred embodiment of the switching means.

FIG. 4 of the drawings is a plan view of valve apparatus 20 according to the present invention illustrating a preferred embodiment of means for rotating cross shaft 56. Such means for rotating cross shaft 56 is positioned outside housing 24 and connected to cross shaft 56. Such means for rotating includes, in the preferred embodiment, electromagnets 62 and 64 having a plunger 66 therebetween. When electromagnet 64 is energized, plunger 66 is pulled into electromagnet 64 and pin 68, which is attached to plunger 66, contacts locking arm 70. Locking arm 70 is free to rotate about cross shaft 56 and contacts locking pall 72 thereby disengaging it from anchor arch 74. As locking arm 70 continues to move it contacts arm 76 at contact pad 78. Both locking arm 70 and arm 76 move together thereby rotating cross shaft 56 and causing the rubber balls in valve apparatus 20 to seat and unseat. Locking pall 80 is engaged in anchor arch 74 causing arm 76 to be locked in position as current flow to electromagnet 64 is terminated.

To cause spools 44 and 46 in FIGS. 2 and 3 to shift positions, electromagnet 62 is energized moving plunger 66 into the electromagnet 62. Pin 68 then moves locking arm 70 toward electromagnet 62 and locking arm 70 contacts locking pall 80, disengaging it from anchor arch 74. Locking arm 70 contacts arm 76 thereby causing spools 44 and 46 to shift positions. Locking pall 72 locks on anchor arch 74 holding arms 76 in the selected position as current flow to electromagnet 62 is terminated. In this manner, spools 44 and 46 in valve apparatus 20 are locked in the desired position thereby negating the continuous energizing of the electromagnets.

It is envisioned according to this invention that a fuel level sensor be provided for each fuel tank 12 and 14 illustrated in FIG. 1. Fuel gauges could also be used in cooperation with the fuel sensors to monitor the fuel levels. The outputs of the fuel level sensors are received by a solid state control module. It is further envisioned according to this invention that the switching means described above be capable of being automatically activated while cooperating with the fuel sensors for tanks 12 and 14. The arithmetical average of the output of the fuel level sensors (total fuel quantity) is transmitted to the fuel level gauge thereby providing the operator with an accurate fuel level reading. Such an automatic switching means switches fuel flow from one tank to the other when one or both of the tanks reaches a predetermined fuel level. The control module compares the level sensor inputs and switches the valve to the tank with the highest level. If the level in both tanks is equal, the control logic will leave the valve apparatus in its prior position. When the fuel level in one tank drops 10% below the opposing tank and remains there for thirty (30) seconds, the control logic switches the valve 20 to the other tank. The control module repeats the same logic, switching from one tank to another, based on a 10% differential level. In this manner, when the fuel level in one tank is drained to a predetermined level, the switching means can be activated automatically to stop flow from that tank and initiate flow from the other.

The switching means described above can also be manually operated in the event that the automatic switching means malfunctions. Such a manual operation of the switching means enables a vehicle operator to monitor the levels of fuel in the tanks and to adjust flow from the tanks as desired. Whether an automatic switching means is employed or the switching occurs manually, it is clear that use of the valve apparatus in a dual-tank system can provide a torsionally balanced truck frame throughout the fuel utilization process since the levels of fuel in both tanks can be maintained close to one another.

It is thus seen that the present invention provides a novel dual-tank fuel utilization system. It is also seen that the present invention provides such a novel dual-tank fuel utilization system wherein switching fuel flow from one tank to another does not interrupt fuel flow to an engine. It is further seen that the dual-tank fuel utilization system according to this invention can be provided with automatic switching means to control fuel flow from the dual-tank system. It is further seen that the dual-tank fuel utilization system according to this invention can be manually operated to control fuel flow from the dual-tank system. It is still further seen that the present invention provides a dual-tank fuel utilization system which provides balanced torsional loading of the truck frame. Many variations are apparent to those of skill in the art, and such variations are embodied within the spirit and scope of the present invention as measured by the following appended claims.

I claim:

1. A dual-tank fuel utilization system comprising:
  a first fuel tank and a second fuel tank, each defining an interior;
  a draw tube terminating at a low end in the interior of each tank and a return tube extending partially into each tank;
  a valve apparatus comprising:
    a housing having two inlet ports, each inlet port in fluid communication with the draw tube of one of said fuel tanks, two exit ports, each exit port in fluid communication with the return tube of one of said fuel tanks, and exit port for fluid communication with a fuel supply of an engine and an inlet port for fluid communication with a return line from the engine;
    a plurality of passages defined within said housing including a separate first passage connecting the two inlet ports that communicate with the draw tubes to the exit port for communication with the fuel supply of an engine;
    said plurality of passages further including a separate second passage connecting the two exit ports that communicate with the return tubes to the inlet port for communication with the return line from the engine;
    switching means inside said housing for selectively blocking one of said inlet ports connected by said first passage and blocking one of said exit ports connected by said second passage while simultaneously allowing flow into another of said inlet ports connected by said first passage and allowing flow from another of said exit ports connected by said second passage; and
    said switching means for blocking comprising two moveable members located within said housing and connected such that movement of one member in one direction causes the other member to move in an opposite direction.

2. The dual-tank fuel utilization system according to claim 1 wherein the inlet port in fluid communication with the draw tube of said first fuel tank is blocked when the exit port in fluid communication with the return tube of said first fuel tank is blocked, and the inlet port in fluid communication with the draw tube of said second fuel tank is blocked when the exit port in fluid communication with the return tube of said second fuel tank is blocked.

3. The method of utilizing fuel in a dual-tank fuel system comprising the steps of:
  providing a valve in connection between an engine and first and second fuel tanks, said valve comprising:
    a housing having two inlet ports, each inlet port in fluid communication with the draw tube of one of said fuel tanks, two exit ports, each exit port in fluid communication with the return tube of one of said fuel tanks, and exit port for fluid communication with a fuel supply of an engine and an inlet port for fluid communication with a return line from the engine;
    a plurality of passages defined within said housing including a separate first passage connecting the two inlet ports that communicate with the draw tubes to the exit port for communication with the fuel supply of an engine;
    said plurality of passages further including a separate second passage connecting the two exit ports that communicate with the return tubes to the inlet port for communication with the return line from the engine; and
    switching means inside said housing for selectively blocking one of said inlet ports connected by said first passage and blocking one of said exit ports connected by said second passage while simultaneously allowing flow into another of said inlet ports connected by said first passage and allowing flow from another of said exit ports connected by said second passage;
  drawing fuel from either the first or second fuel tank through said valve and to the engine while the engine is running;
  said switching means for blocking comprising two moveable members located within said housing and connected such that movement of one member in one direction causes the other member to move in an opposite direction;
  automatically switching through said valve to draw fuel from another of said first or second fuel tanks when a level of either tank is a predetermined amount below a level of the other tank; and
  returning surplus fuel from the engine through said valve to either the first or second fuel tank after the engine stops running.

4. The method according to claim 3 wherein said predetermine amount is ten percent (10%).

5. A valve apparatus for use with a dual-tank fuel system comprising:

a housing having two inlet ports, each inlet port in fluid communication with the draw tube of one of said furl tanks, two exit ports, each exit port in fluid communication with the return tube of one of said fuel tanks, an exit port for fluid communication with a fuel supply of an engine and an inlet port for fluid communication with a return line form the engine;

a plurality of passages defined within said housing including a separate first passage connecting the two inlet ports that communicate with the draw tubes to the exit port for communication with the fuel supply of an engine;

said plurality of passages further including a separate second passage connecting the two exit ports that communicate with the return tubes to the inlet port for communication with the return line from the engine; and switching means inside said housing for selectively blocking one of said inlet ports connected by said first passage and blocking one of said exit ports connected by said second passage while simultaneously allowing flow into another of said inlet ports connected by said first passage and allowing flow from another of said exit ports connected by said second passage;

said switching means for blocking comprising two moveable members located within said housing and connected such that movement of one member in one direction causes the other member to move in an opposite direction.

6. A duel-tank fuel utilization system comprising:

a first fuel tank and a second fuel tank, each defining an interior;

a draw tube terminating at a low end in the interior of each tank and a return tube extending partially into each tank;

a valve apparatus comprising:
  a housing having two inlet ports, each inlet port in fluid communication with the draw tube of one of said fuel tanks, two exit ports, each exit port in fluid communication with the return tube of one of said fuel tanks, an exit port for fluid communication with a fuel supply of an engine and an inlet port for fluid communication with a return line from the engine;

a plurality of passages defined within said housing including a separate first passage connecting the two inlet ports that communicate with the draw tubes to the exit port for communication with the fuel supply of an engine;

said plurality of passages further including a separate second passage connecting the two exit ports that communicate with the return tubes to the inlet port for communication with the return line from the engine;

switching means inside said housing for selectively blocking one of said inlet ports connected by said first passage and blocking one of said exit ports connected by said second passage while simultaneously allowing flow into another of said inlet ports connected by said first passage and allowing flow from another of said exit ports connected by said second passage; and said switching means for blocking comprising a plurality of rubber balls movable by at least two spools located within said housing, said spools having a connection such that movement of one spool in one direction causes the other spool to move in an opposite direction.

7. A dual-tank fuel utilization system according to claim 6 further comprising:

a movable cross shaft extending centrally through said housing; and a leaf spring attached to the cross shaft and connecting the spools, whereby rotation of the cross shaft causes the leaf spring to operate said switching means for blocking.

8. A duel-tank fuel utilization system according to claim 7 further comprising:

means for rotating the cross shaft, said means for rotating positioned outside said housing and connected to the cross shaft; and said means for rotating including a plurality of electromagnets having a plunger movable therebetween.

9. A duel-tank fuel utilization system according to claim 8 further comprising locking means for locking said lever arm into position.

* * * * *